US010071613B2

(12) United States Patent
Hirabayashi et al.

(10) Patent No.: US 10,071,613 B2
(45) Date of Patent: Sep. 11, 2018

(54) VEHICLE

(71) Applicant: TOYOTA JIDOSHA KABUSHIKI KAISHA, Toyota-shi, Aichi-ken (JP)

(72) Inventors: Hidekazu Hirabayashi, Chiryu (JP); Kunihiko Jinno, Toyota (JP); Hiroaki Matsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 451 days.

(21) Appl. No.: 14/463,935

(22) Filed: Aug. 20, 2014

(65) Prior Publication Data

US 2015/0102119 A1     Apr. 16, 2015

(30) Foreign Application Priority Data

Oct. 16, 2013  (JP) ................................. 2013-215362

(51) Int. Cl.
*B60H 1/22*     (2006.01)
*B60H 1/00*     (2006.01)

(52) U.S. Cl.
CPC ..... *B60H 1/00657* (2013.01); *B60H 1/00778* (2013.01); *B60H 1/2218* (2013.01); *B60H 2001/2234* (2013.01)

(58) Field of Classification Search
CPC ... B60H 1/00; B60H 1/34; B60H 1/22; B60H 1/00657
USPC .................................................. 454/121, 62
See application file for complete search history.

(56) References Cited

U.S. PATENT DOCUMENTS

| 7,455,531 | B2* | 11/2008 | Hirabayashi | ......... | H01R 13/025 |
| | | | | | 174/154 |
| 7,616,270 | B2* | 11/2009 | Hirabayashi | ...... | G02F 1/133308 |
| | | | | | 349/59 |
| 7,967,454 | B2* | 6/2011 | Hirabayashi | ...... | G02F 1/133382 |
| | | | | | 174/250 |
| 8,351,208 | B2* | 1/2013 | Hirabayashi | ...... | G02F 1/133382 |
| | | | | | 165/104.33 |
| 8,373,806 | B2* | 2/2013 | Hirabayashi | ...... | G02F 1/133308 |
| | | | | | 349/5 |
| 9,030,622 | B2* | 5/2015 | Hirabayashi | ...... | G02F 1/133308 |
| | | | | | 349/58 |
| 9,250,005 | B2* | 2/2016 | Oomura | ............. | B60H 1/00785 |

(Continued)

FOREIGN PATENT DOCUMENTS

| JP | A-06-135218 | 5/1994 |
| JP | 2008-184103 A | 8/2008 |
| JP | A-2012-076517 | 4/2012 |

*Primary Examiner* — Steven B McAllister
*Assistant Examiner* — Samantha Probst
(74) *Attorney, Agent, or Firm* — Oliff PLC

(57) ABSTRACT

A controller controls an air-conditioning device so that air of the air-conditioning device is supplied to a cabin based on a warm-up state of air of the air-conditioning device. When remote air conditioning is performed, the controller controls the air-conditioning device so that air of the air-conditioning device is supplied to the cabin even in a state where the warm-up state is lower than in a case where air of the air-conditioning device is supplied to the cabin of the vehicle in the operation air conditioning. In a manner described above, a vehicle capable of suppressing power loss and lengthening of charging time in heating during the remote air conditioning and the preliminary air conditioning is provided.

3 Claims, 4 Drawing Sheets

(56) References Cited

U.S. PATENT DOCUMENTS

| | | | | |
|---|---|---|---|---|
| 9,340,090 B2* | 5/2016 | Fukatsu | ............ | B60H 1/00392 |
| 9,455,948 B2* | 9/2016 | Sankar | ................. | H04L 61/103 |
| 9,604,521 B2* | 3/2017 | Hirabayashi | ......... | F02D 41/068 |
| 9,796,241 B2* | 10/2017 | Takeuchi | ........... | B60H 1/00735 |
| 2011/0005255 A1* | 1/2011 | Tanihata | ............ | B60H 1/00785 |
| | | | | 62/238.7 |
| 2011/0127025 A1* | 6/2011 | Bohme | ............. | B60H 1/00271 |
| | | | | 165/202 |
| 2013/0000325 A1* | 1/2013 | Asai | ................... | B60H 1/00278 |
| | | | | 62/3.61 |
| 2014/0041826 A1* | 2/2014 | Takeuchi | ................. | B60L 1/02 |
| | | | | 165/10 |

* cited by examiner

VEHICLE

This nonprovisional application is based on Japanese Patent Application No. 2013-215362 filed on Oct. 16, 2013, with the Japan Patent Office, the entire contents of which are hereby incorporated by reference.

BACKGROUND OF THE INVENTION

Field of the Invention

The present invention relates to a vehicle, particularly to air conditioning of a vehicle.

Description of the Background Art

Conventionally, for heating of a vehicle, there is a case where a control is executed so as not to perform blowing of air until a temperature of air supplied from a blow outlet into a cabin becomes higher than or equal to a predetermined temperature. Such a control can prevent blowing of air which has not been sufficiently warmed up in an initial stage of heating operation (for example, refer to Japanese Patent Laying-Open No. 6-135218).

SUMMARY OF THE INVENTION

With the control of not performing blowing in the initial stage of the heating operation, the cabin is not heated during the period of not performing the blowing. Therefore, a heating efficiency is lowered. Further, energy is consumed also during the period of not performing the blowing. In the case where the heating is performed with use of engine coolant water as a heat source, energy for heating the coolant water or the like is consumed. In the case where the heating is performed with use of a heat pump as a heat source, energy is consumed for operation of a compressor or the like.

Further, a control of suppressing a blowing amount (for example, to zero) in an initial stage of heating operation and thereafter gradually increasing the blowing amount along with a rise in temperature of a heat medium or the like can also be conceived. However, if such a control is executed, suppression of the blowing amount inhibits the increase in a heat radiation amount during the heating with use of the heat pump. Therefore, a load to a compressor or the like becomes larger. Consequently, more energy is consumed at the compressor or the like, so that energy loss (mainly the power loss) increases.

Heating of a cabin can be performed in advance before a user rides in a vehicle (which is so-called "preliminary air conditioning"). In vehicles such as an electric vehicle and a hybrid vehicle using power of a battery as a running source, consumed power of an air-conditioning device used for the preliminary air conditioning is supplied from a battery or a power supply which is provided outside of the vehicle (external power supply) and connected to the vehicle to charge the battery (for example, refer to Japanese Patent Laying-Open No. 2012-076517). The preliminary air conditioning is performed by means of timer setting or remote operation (remote air conditioning) in some cases. In the heating with the preliminary air conditioning, if the control of not performing blowing in the initial stage of the heating operation and the control of gradually increasing the blowing amount are executed as described above, the power loss is increased and the heating efficiency is lowered.

Further, there is a case where the preliminary air conditioning or the remote air conditioning are performed during charging of a battery. In such a case, the power of the external power supply is used for charging of the battery and for the remote air conditioning. Consequently, the power for charging of the battery is reduced by the amount of consumed power for the preliminary air conditioning, so that more time is taken for charging of the battery.

An object of the present invention is to provide a vehicle which is capable of suppressing loss of power for heating and suppressing lengthening of the time for charging of the battery during the remote air conditioning and the preliminary air conditioning.

According to one aspect, the present invention relates to a vehicle. The vehicle includes an air-conditioning device which heats a cabin with use of power of an external power supply or the vehicle, and a controller which allows the air-conditioning device to perform remote air conditioning, which is air conditioning performed in a state where a user is not riding in the vehicle, and operation air conditioning, which is air conditioning performed in a state where the user is riding in the vehicle. The controller controls the air-conditioning device so that air of the air-conditioning device is supplied to the cabin of the vehicle based on a warm-up state of the air of the air-conditioning device. Further, when the remote air conditioning is performed, the controller controls the air-conditioning device so that air of the air-conditioning device is supplied to the cabin even in a state where the warm-up state is lower than in a case where air of the air-conditioning device is supplied to the cabin in the operation air conditioning.

In the heating operation, a temperature of air supplied from the air-conditioning device to the cabin in the state where the warm-up state is low (initial temperature) is a temperature which gives discomfort as cold wind to a passenger. However, even such air at the initial temperature may contribute to heating if the temperature is higher than the temperature in the cabin and the air is blown into the cabin. If the remote air conditioning is employed which is performed in the state where a user is not riding in the vehicle, a supply of air at the initial temperature into the cabin does not give discomfort to a user. According to the vehicle with the configuration as described above, when the remote air conditioning is performed, air of the air-conditioning device is supplied to the cabin even in a state where the warm-up state is lower than in the case where air of the air-conditioning device is supplied to the cabin of the vehicle in the operation air conditioning. In other words, in the remote air conditioning, the time of performing blowing in the initial stage of the heating operation increases in comparison with the time in the operation air conditioning, so that the heating efficiency is improved. Consequently, the loss of power for heating is reduced.

Preferably, in the remote air conditioning, when an air quantity of the air-conditioning device is controlled, the controller does not take into account the warm-up state but takes into account a target blowing temperature to control the air quantity of the air-conditioning device.

According to this configuration, during the remote air conditioning, it is not necessary to take into account the warm-up state of the air quantity control of the air-conditioning device. Therefore, the control can be simplified.

Further, according to another aspect, a vehicle includes an air-conditioning device which heats a cabin with use of power of an external power supply or a vehicle, and a controller which allows the air-conditioning device to perform remote air conditioning, which is air conditioning performed by operation to a remote controller, and operation air conditioning, which is air conditioning performed by operation to an operation panel in the cabin. The controller controls the air-conditioning device so that air of the air-conditioning device is supplied to the cabin of the vehicle based on a warm-up state of the air of the air-conditioning device. Further, when the remote air conditioning is performed, the controller controls the air-conditioning device so that air of the air-conditioning device is supplied to the cabin even in a state where the warm-up state is lower than in a case where air of the air-conditioning device is supplied to the cabin of the vehicle in the operation air conditioning.

According to the vehicle with this configuration, a user can designate remote air conditioning and operation air conditioning by properly using the operation to a remote controller and the operation to an operation panel. Further, the loss of power for heating can also be reduced.

According to the present invention, in the remote air conditioning and preliminary air conditioning, the loss of power for heating can be suppressed, and lengthening of the time for charging of a battery can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
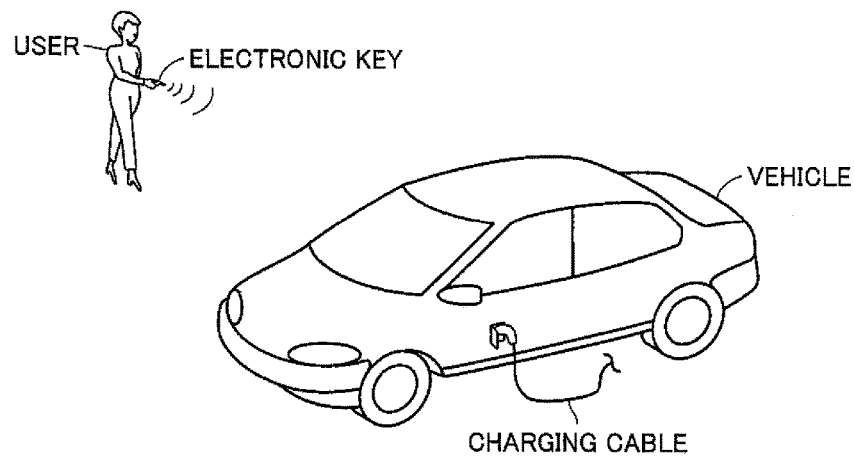
FIG. 1 illustrates user's operation.

In the following, an embodiment of the present invention will be described in detail with reference to the drawings. In the drawings, the same or corresponding parts have the same reference numerals allotted, and description thereof will not be repeated.

Figure 2:
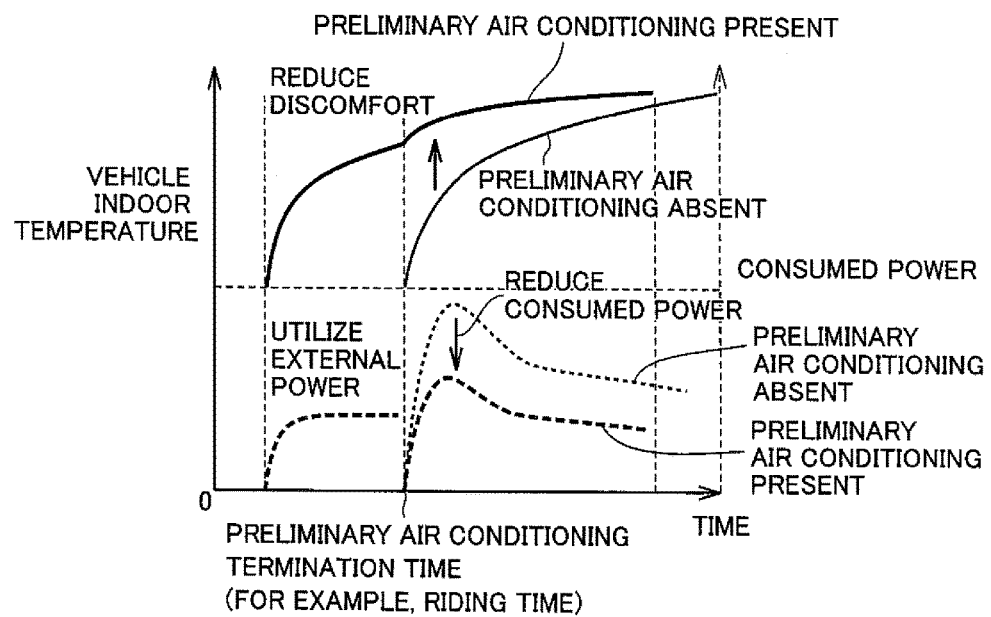
FIG. 2 illustrates a preliminary air-conditioning (pre-ride air-conditioning driving) system.

FIGS. 1 and 2 illustrate a preliminary air-conditioning (pre-ride air-conditioning driving) system. FIG. 1 illustrates user's operation, and FIG. 2 is a graph showing a comparison between a cabin indoor temperature and consumed power in relation to presence and absence of preliminary air conditioning.

As shown in FIG. 1, a user can control a vehicle by operating an electronic key even in a state where a vehicle cannot run, for example, in a case where the user is not riding in the vehicle. In place of the electronic key, a mobile communication terminal such as a smart phone may be used. The electronic key is configured to be communicable with the vehicle through a wireless communication or the like. Operation of the electronic key may include air conditioning operation of the vehicle (remote air conditioning). The operation of the electronic key may also include user verification and a vehicle door lock control.

The vehicle is a hybrid vehicle, an electric vehicle, or the like using power of a storage device (battery) as a running source. The battery is chargeable with use of power from a power supply outside the vehicle (external power supply) through a charging cable. Such a hybrid vehicle is sometimes referred to as a plug-in hybrid vehicle.

The vehicle is air-conditioned by an air-conditioning device mounted to the vehicle. The air-conditioning device is basically operated by power from the battery, A user can perform air conditioning of the vehicle by operating the electronic key before riding in the vehicle (preliminary air conditioning). Further, the user can perform air conditioning by operating an operation panel in the cabin in a state where the vehicle can run, for example, in a case where the user is riding in the vehicle (operation air conditioning). If the preliminary air conditioning is performed when the charging cable is connected to the vehicle, power from the external power supply can be used for the preliminary air conditioning.

In FIG. 2, the upper side of the graph represents a cabin indoor temperature. In an initial stage, the cabin indoor temperature is relatively low. The low cabin indoor temperature gives discomfort of coldness to a user. In a case where the preliminary air conditioning is not performed ("preliminary air conditioning absent" in the graph), the cabin indoor temperature at the riding time is not different from the temperature before riding. Therefore, the user who rides in the vehicle feels discomfort. After that, air conditioning is started by user's operation of the operation panel or the like, and the cabin indoor temperature rises. On the other hand, in a case where the preliminary air conditioning is performed ("preliminary air conditioning present" in the graph), air conditioning is performed before the riding time. Therefore, the cabin indoor temperature becomes relatively high at the riding time. Consequently, the user who rides in the vehicle feels comfortable. In other words, the preliminary air conditioning reduces the discomfort of coldness.

In FIG. 2, the lower side of the graph represents consumed power for air conditioning. In the case where the preliminary air conditioning is not performed ("preliminary air conditioning absent" in the graph), consumed power due to air conditioning occurs after the riding time. This consumed power is consumed power of the battery. On the other hand, in the case where the preliminary air conditioning is performed ("preliminary air conditioning present" in the graph), power from the external power supply (external power) is utilized before the riding time. Consequently, in the case where the preliminary air conditioning is performed, consumed power due to air conditioning, in other words, consumed power of the battery after the riding time is reduced as compared to the case where the preliminary air conditioning is not performed.

The air-conditioning device can perform heating operation of providing warm air into the cabin and cooling operation of providing cold air into the cabin. The air-conditioning device can also perform ventilation operation of providing air from outside of the cabin into the cabin.

[Configuration of Vehicle]

Figure 3:
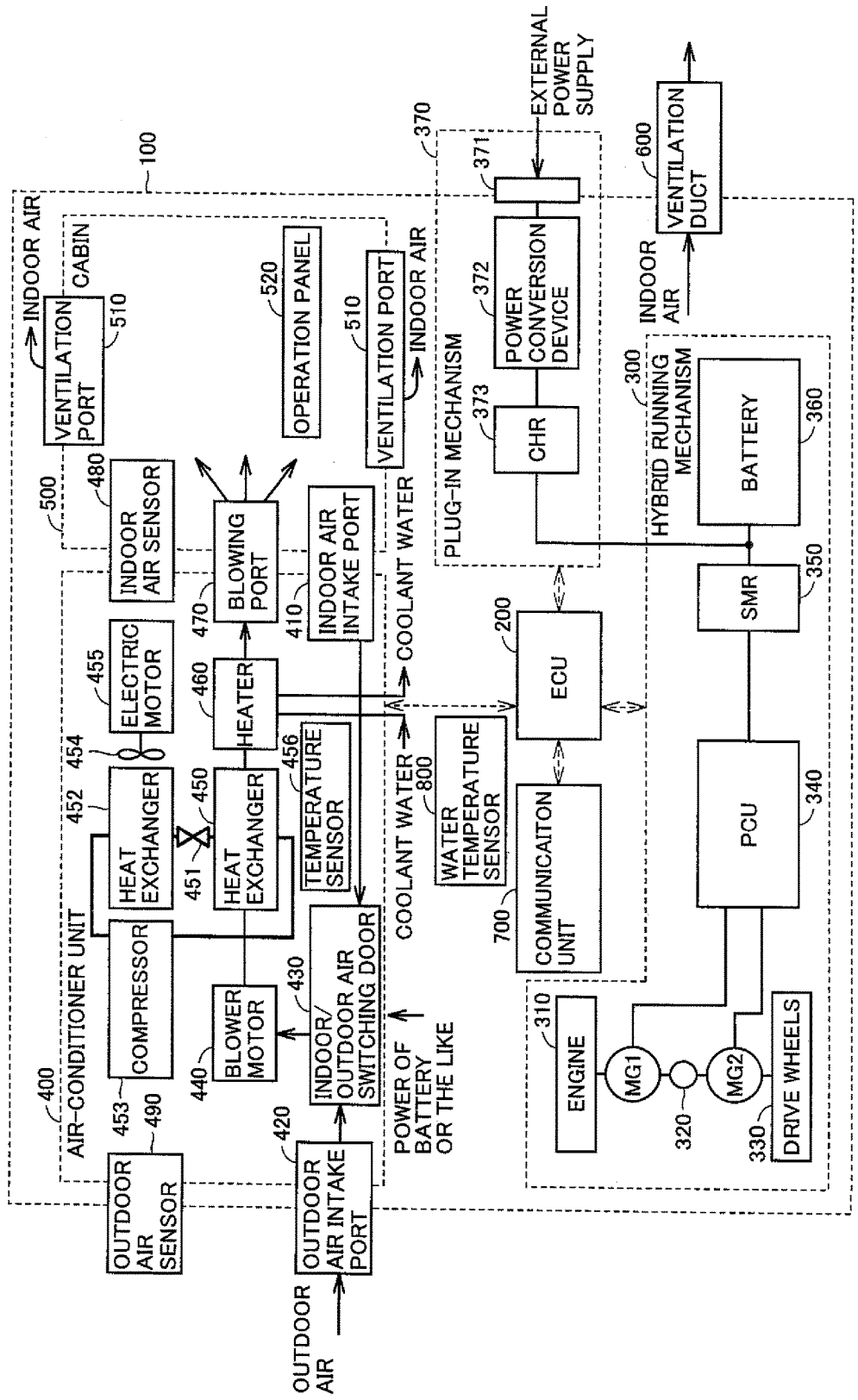
FIG. 3 illustrates an example of a schematic configuration of a vehicle according to an embodiment.

FIG. 3 illustrates an example of a schematic configuration of a vehicle according to the embodiment, A vehicle 100 includes an ECU (Electric Control Unit) 200 which is a controller for controlling components included in vehicle 100. Vehicle 100 is a so-called plug-in hybrid vehicle. Therefore, vehicle 100 includes a hybrid running mechanism 300 and a plug-in mechanism 370. Further, vehicle 100 includes an air-conditioning device (air-conditioner unit) 400 for performing air-conditioning in cabin 500. Further, vehicle 100 includes a ventilation duct 600, a communication unit 700, and a water temperature sensor 800.

Hybrid running mechanism 300 can cause drive wheels 330 to be driven by an internal combustion engine (engine) 310 and motor generators MG1, MG2. Output torque of motor generators MG1, MG2 is transmitted to drive wheels 330 through a power split mechanism 320. Further, power stored in a storage device (battery) 360 is converted by a PCU (Power Control Unit) 340 into power for driving motor generators MG1, MG2. Further, the power generated by motor generators MG1, MG2 is converted by PCU 340 into power for charging battery 360. A system main relay SMR switches connected/disconnected states between battery 360 and PCU 340. The power of battery 360 is also used for an air-conditioner unit 400.

Plug-in mechanism 370 is configured so that power is supplied from a power supply outside of vehicle 100 through an inlet 371. The power supplied to inlet 371 is converted by a power conversion device 372. The converted power is supplied as charging power to battery 360 through a charging relay (CHR) 373.

Air-conditioner unit 400 includes an indoor air intake port 410, an outdoor air intake port 420, an indoor/outdoor air switching door 430, a blower motor 440, heat exchangers 450, 452, an adjustment valve 451, a compressor 453, an electric fan 454, an electric motor 455, a temperature sensor 456, a heater 460, a blowing port 470, an indoor air sensor 480, and an outdoor air sensor 490.

Air-conditioner unit 400 can perform heating operation of providing (supplying) warm air into cabin 500. In the heating operation, air inside of cabin 500 (indoor air) is taken through indoor air intake port 410, or air outside of vehicle 100 (outdoor air) is taken through outdoor air intake port 420. The taken air passes through indoor/outdoor air switching door 430, is blown onto heat exchanger 450 by blower motor 440, and then passes through heater 460. Heater 460 may be bypassed to avoid warming by heater 460. Heat exchanger 450 exerts a warming function by means of heat pump operation utilizing adjustment valve 451, heat exchanger 452, and compressor 453. In that case, for example, heat exchanger 450 serves as a condenser. Heater 460 utilizes heat of coolant water for engine 310 or the like to exert a warming function. Air having passed through heat exchanger 450 and/or heater 460 becomes warm air and is supplied to blowing port 470. A temperature of the air provided from blowing port 470 in the heating operation (target blowing temperature TAO(° C.) is determined taking into account various elements such as a set temperature of air-conditioner unit 400 and the environment under which vehicle 100 is provided (for example, under the sunshine).

Air-conditioner unit 400 can perform the cooling operation and ventilation operation in addition to the heating operation. In the cooling operation, air with a temperature lowered by the cooling function of heat exchanger 450 is provided from blowing port 470 into cabin 500. In the ventilation operation, air taken into outdoor air intake port 420 (outdoor air) is provided from blowing port 470 into cabin 500. In the cooling operation and ventilation operation, heater 460 is bypassed.

Switching between the heating function and the cooling function of heat exchanger 450 is performed by switching output directions of compressor 453. This switching is achieved, for example, by providing a four-way valve, which is not illustrated in the drawings, to compressor 453. In the case of allowing heat exchanger 450 to exert the heating function, the output direction of compressor 453 is switched to the side of heat exchanger 450. On the other hand, in the case of allowing heat exchanger 450 to exert the cooling function, the output direction of compressor 453 is switched to the side of heat exchanger 452. Heat exchanger 452 can be cooled by air from electric fan 454. Temperature sensor 456 measures a temperature of heat exchanger 450 and the like. Electric motor 455 drives electric fan 454. The power from battery 360 is utilized for the operation of air-conditioner unit 400 including the operation of compressor 453 and electric motor 455 as well as the operation of heater 460. The power from the external power supply taken by plug-in mechanism 370 may be utilized for the operation of air-conditioner unit 400.

Indoor air sensor 480 measures an air temperature (Tr) inside of cabin 500. Outdoor air sensor 490 measures an air temperature (Tam) outside of vehicle 100.

Cabin 500 is a riding space for a user. Cabin 500 is provided with a ventilation port 510. In the ventilation operation, air inside of cabin 500 (indoor air) passes from ventilation port 510 through a discharging passage (not illustrated), and then is discharged outside of vehicle 100 from ventilation duct 600. The discharging passage may be provided such that indoor air to be discharged and battery 360 perform heat exchange. Further, an operation panel 520 is provided in cabin 500. A user operates operation panel 520 to perform air conditioning.

Further, operation panel 520 is provided with an operation button and the like for setting vehicle 100 to be READY-ON (runnable state). ECU 200 determines that a user is riding in the case where vehicle 100 is in READY-ON, and determines that a user is not riding in other case, that is, the case where vehicle 100 is in READY-OFF (non-runnable state). A sensor may be provided in a driver's seat for determination of whether or not a user is riding.

Communication unit 700 communicates with outside of vehicle 100. Communication unit 700 performs a wireless communication with the electronic key as shown in FIG. 1.

Water temperature sensor 800 measures a water temperature of coolant water for engine 310 or the like.

[Description of Air Conditioning Operation]

With the configuration described above, vehicle 100 can perform charging of battery 360 with use of power from a power supply provided outside of vehicle 100. Further, air conditioning is performed by ECU 200 controlling air-conditioner unit 400. Air conditioning may be performed in advance before a user rides in vehicle 100 (preliminary air conditioning). A user can operate the electronic key mentioned above so that the preliminary air conditioning is performed (remote preliminary air conditioning). Air conditioning is performed also in the state where a user rides in vehicle 100 (operation air conditioning). A user can operate operation panel 520 or operate the electronic key so that operation air conditioning is performed.

In the air conditioning, the heating operation can be performed. As mentioned above, the heating operation is achieved by the heat pump operation by means of heat exchangers 450, 452, adjustment valve 451, and compressor 453, or achieved by heater 460 using heat of coolant water for engine 310. The heating by the heat pump operation requires heating of a condenser (heat exchanger 450). However, it takes a certain amount of time to raise the temperature of the condenser. Further, heating by heater 460 requires heating of coolant water, that is, warming up of engine 310. However, it takes a certain amount of time to warm up engine 310. Therefore, in an initial stage of the heating operation, heating equipment such as heat exchanger 450 and heater 460 are in a state where the function of heating air cannot be exerted sufficiently. In other words, in the initial stage of the heating operation, the warm-up state of the heating equipment is in the low state. When blower motor 440 is operated in the state where the warm-up state is low, air which is not warmed sufficiently is supplied from blowing port 470 into cabin 500. At that time, if a user is riding (there is a passenger), air which is not sufficiently warmed blows onto a user, thus the user possibly feel discomfort.

To avoid such a disadvantage, for example, restricting operation of blower motor 440 to control blowing of air from blowing port 470 in the initial stage, in other words, in the state where the warm-up state is low can be conceived. In that case, for example, the control of suppressing the blowing amount (for example, setting to be zero) in the initial stage of the heating operation and thereafter gradually increasing the blowing amount along with the rise in temperature of coolant water and heater 460 (in the following, it may be referred to as "warm-up control") can be conceived. In the warm-up control, the air quantity of air to be supplied from blowing port 470 to cabin 500 is calculated based on the temperature of coolant water or the temperature of the condenser. In other words, in the warm-up control, the air quantity is controlled taking into account the warm-up state of air-conditioner unit 400.

Figure 4:
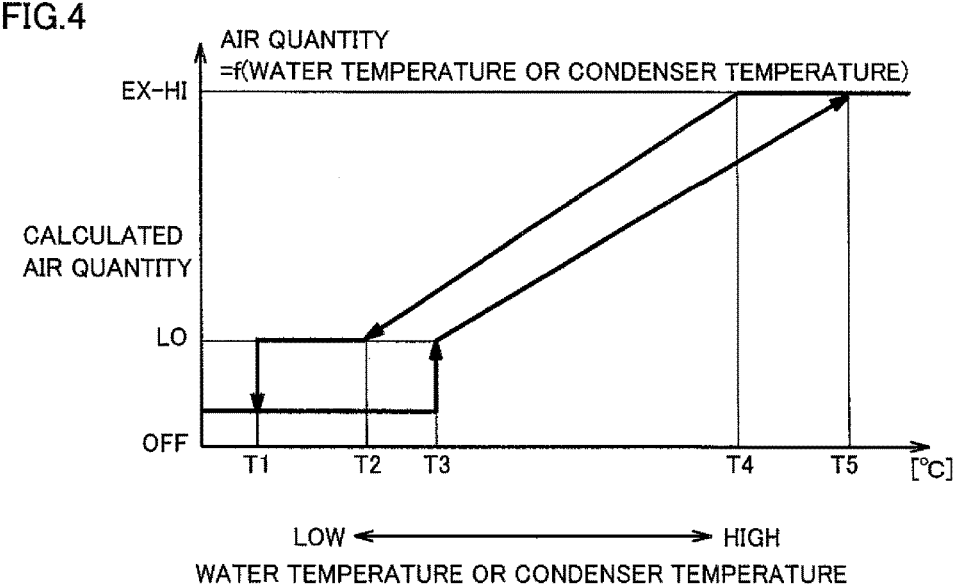
FIG. 4 illustrates a warm-up control.

FIG. 4 illustrates the warm-up control. The graph shown in FIG. 4 has a horizontal axis denoting a water temperature of coolant water or a temperature of a condenser, and a vertical axis denotes a calculated air quantity. For example, firstly, when the temperature of the condenser or the like is lower than or equal to T1 (° C.), the calculated air quantity becomes zero. In other words, the blower motor is stopped. After that, when the temperature of the condenser or the like rises, and the temperature reaches T3 (° C.), the calculated air quantity becomes a relatively low value ("LO" in the graph) which is not zero. In other words, the blower motor is operated. When the temperature of the condenser or the like rises further, the calculated air quantity also rises along with the rise in temperature. Then, when the temperature of the condenser or the like reaches T5(° C.), the calculated air quantity is fixed at a maximum value ("EX-HI" in the graph). Accordingly, the warming up is completed. In the case where the temperature of the condenser or the like is lowered, the air quantity is also reduced. The air quantity along with the rise in temperature and the air quantity along with the lowering in temperature have a hysteresis property. When the warm-up control is expressed by a function, air quantity=f (water temperature or condenser temperature) is given.

Performing the warm-up control can prevent a supply of air, which is not warmed enough, from blowing port 470 shown in FIG. 3 into cabin 500. In other words, in the state where the warm-up state is low, blowing from blowing port 470 may be restricted (stopping is included). Accordingly, comfort of a user may be achieved. However, when the warm-up control is performed, the effect of heating cabin 500 cannot be obtained much during restriction of the air quantity. Therefore, energy consumed for circulation of coolant water and energy consumed for operation of compressor 453 during the restriction of the air quantity become energy loss in the heating operation. Particularly, when the air quantity is gradually increased along with the rise in temperature of the condenser or the like by the warm-up control, a load to compressor 453 or the like (revolution speed or the like) becomes larger. Consequently, more energy is consumed by compressor 453 or the like, so that the energy loss becomes larger. On the contrary, if the warm-up control is not performed, the load to compressor 453 or the like is maintained constant, so that the consumed power is suppressed.

Figure 5:
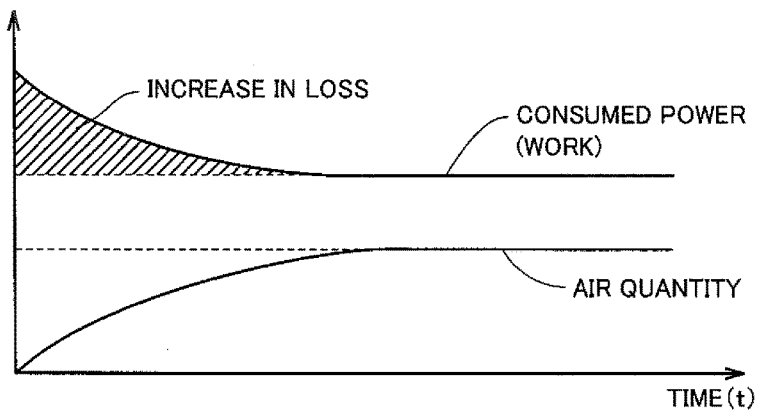
FIG. 5 illustrates an increase in consumed power by the warm-up control.

FIG. 5 illustrates an increase in consumed power due to the warm-up control. The graph shown in FIG. 5 has a horizontal axis denoting time (T) and a vertical axis denoting consumed power (work) and air quantity. The solid lines in the graph represent the case where the warm-up control is performed, and the dot lines represent the case where the warm-up control is not performed. In the case where the warm-up control is not performed, the air quantity and consumed power (work) are also constant with respect to time. On the other hand, in the case where the warm-up control is performed, the air quantity initially increases along with time. Then, after an elapse of a predetermined time period, the air quantity becomes constant. With the change in air quantity, when the warm-up control is performed, the consumed power initially becomes larger. Consequently, when the warm-up control is performed, the consumed power (loss) increases as compared to the case where the warm-up control is not performed.

The air quantity of air supplied from blowing port 470 to cabin 500 may be controlled based on target blowing temperature TAO (hereinafter, also referred to as "TAO control"). In other words, in the TAO control, the air quantity is controlled taking into account target blowing temperature TAO.

Figure 6:
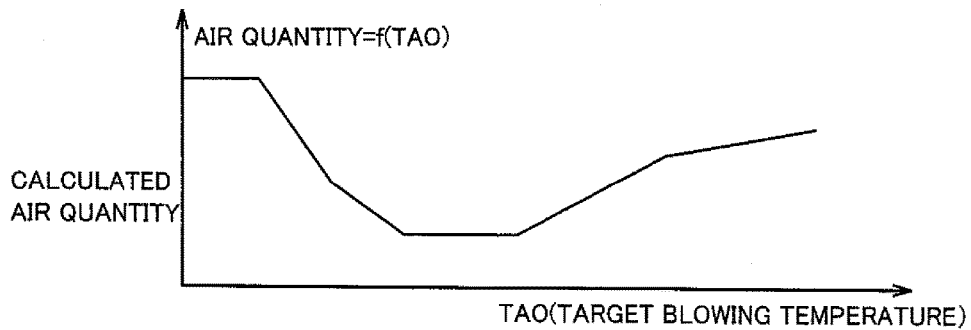
FIG. 6 illustrates a TAO control.

FIG. 6 illustrates the TAO control. The graph shown in FIG. 6 has a horizontal axis denoting target blowing temperature TAO and a vertical axis denoting a calculated air quantity. As shown in FIG. 6, when target blowing temperature TAO is low and high, the air quantity is large. Since it is considered that a user requests immediate effectivity when target blowing temperature TAO is low and high, this addresses such a need. On the other hand, when target blowing temperature TAO is at a temperature other than those, the air quantity is small. This is made because slow air conditioning is enough since it is considered that a user does not request immediate effectivity. In other words, similarly to the warm-up control, the TAO control is also the control taking into account a user's need (comfort or the like). When the TAO control is expressed by a function, air quantity=f (TAO) is given.

The control of air-conditioner unit 400 by ECU 200 shown in FIG. 3 includes the warm-up control and the TAO control described above.

In the operation air conditioning in the state where a user is riding in a vehicle, there is a high necessity to restrict (stopping is included) blowing in the low warm-up state to prevent discomfort to the user (passenger). On the other hand, in the remote air conditioning in the state where a user is not riding in a vehicle, there is a low necessity to restrict blowing even in the low warm-up state. Therefore, in vehicle 100, when the remote preliminary air conditioning is performed, ECU 200 controls air-conditioner unit 400 so that air is supplied to cabin 500 even in the state where the warm-up state is lower than in the case where air of the air-conditioning device is supplied to the cabin of a vehicle in the operation air conditioning. In an extreme case, air is supplied to cabin 500 in the remote preliminary air conditioning even in the case where almost no heating is performed.

Figure 7:
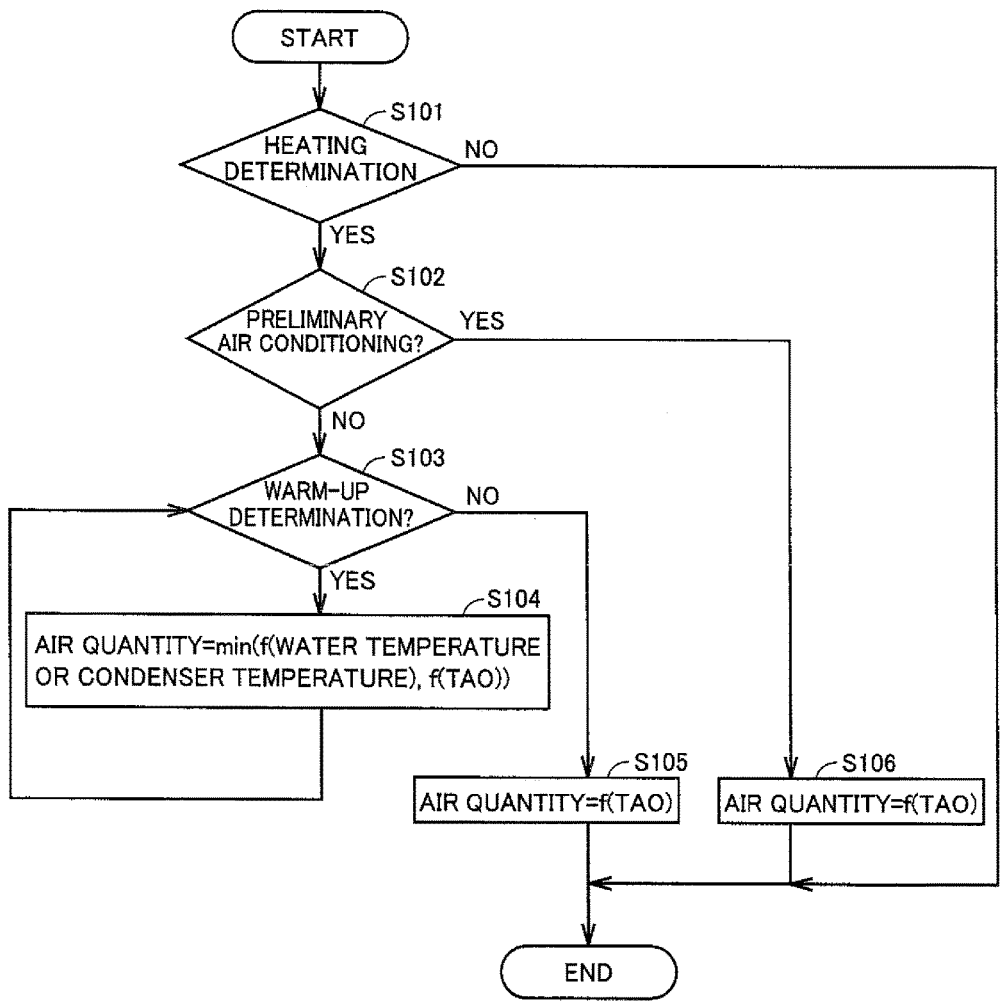
FIG. 7 is a flowchart which illustrates processes executed in air-conditioning.

FIG. 7 is a flowchart which illustrates processes executed in air conditioning. The processes of this flowchart are executed by ECU 200 shown in FIG. 4. The processes shown in this flowchart is started when, for example, user's operation relating to air conditioning is performed.

Referring to FIGS. 3 and 7, firstly, determination is made on whether or not air conditioning (heating) is required (step S101). For example, when target blowing temperature TAO calculated (computed) based on a temperature of air conditioning set by user's operation is higher than cabin indoor temperature Tam, it is determined that heating is required. When TAO is lower than Tam, it is determined that heating is not required. When the heating is required (YES in step S101), the process proceeds to step S102. On the other hand, when the heating is not required (NO in step S101), the process of the flowchart is terminated.

In step S102, determination is made on whether or not preliminary air conditioning is to be performed. For example, when a user is not riding (the case where the vehicle is in READY-OFF), or when the user's operation mentioned above is the remote operation with use of an electronic key, it is determined that the preliminary air conditioning is to be performed. On the contrary, when the user is riding, or when the user's operation mentioned above is the operation to the operation panel, it is determined that the preliminary air conditioning is not to be performed (for example, the operation air conditioning is to be performed). When the preliminary air conditioning is to be performed (YES in step S102), the process proceeds to step S106. On the other hand, when the preliminary air conditioning is not to be performed (NO in step S102), the process proceeds to S103.

In step S103, warm-up determination is performed. The warm-up determination is a determination on whether or not the warm-up control shown in FIG. 4 is performed (during warm-up). When heating equipment is under the warm-up (YES in step S103), the process proceeds to step S104. On the other hand, when heating equipment is not under the warm-up, in other words, when the warm-up of the heating equipment is completed (NO in step S103), the process proceeds to step S105.

In step S104, the air quantity of air blowing out from blowing port 470 is calculated, and blowing is performed with the calculated air quantity. In this step S104, the air quantity is calculated taking into account the temperature of coolant water or the temperature of the condenser with target blowing temperature TAO. Specifically, the air quantity is employed which has a smaller value between the calculated air quantity (=f(water temperature or condenser temperature)) in the warm-up control and the calculated air quantity (=f(TAO)) in the TAO control. Accordingly, blowing of air in the low warm-up state onto a user can be suppressed to minimum. After the process of step S104 is executed, the process returns to step S103 again.

In step S105, the air quantity of air blown out from blowing port 470 is calculated, and blowing is performed with the calculated air quantity. In this step S105, the air quantity is calculated without taking into account the temperature of coolant water or the temperature of the condenser but target blowing temperature TAO. Specifically, the air quantity is employed which is the calculated air quantity (=f(TAO)) in the TAO control. After the process of step S105, the process of the flowchart is terminated.

In step S106, the air quantity of air blown out from blowing port 470 is calculated, and blowing is performed with the calculated air quantity. In this step S106, the air quantity is calculated without taking into account the temperature of coolant water or the temperature of the condenser but target blowing temperature TAO. Specifically, the air quantity to be employed is the calculated air quantity (=f(TAO)) in the TAO control. After the process of step S106 is executed, the process of the flowchart is terminated.

According to the flowchart of FIG. 7, in air conditioning which is not the preliminary air conditioning (operation air conditioning), the air quantity is set by the process of step S104 or step S105. In step S104, there is a case where the air quantity is calculated by the warm-up control (in other words, taking into account the temperature of coolant water or the temperature of condenser). In that case, blowing of air in the low warm-up state is prevented. Therefore, in the operation air conditioning, the time of supplying air in the low warm-up state into cabin 500 becomes relatively shorter. Consequently, in the operation air conditioning, the energy loss in the heating operation occurs. On the other hand, in the preliminary air conditioning, the air quantity is set by the process of step S106. In step S106, the air quantity is calculated by the TAO control (in other words, taking into account target blowing temperature TAO). In that case, blowing of air may be performed even in the low warm-up state. Therefore, in the preliminary air conditioning, the time of supplying air in the low warm-up state into cabin 500 becomes relatively longer. Consequently, in the preliminary air conditioning, the energy loss in the heating operation is reduced.

Further, with a plug-in hybrid vehicle as in the present embodiment, there is a case where preliminary air conditioning is performed during charging of a battery. In that case, power of the external power supply is used for charging of a battery and for the preliminary air conditioning. Consequently, the power for charging a battery is reduced by the amount of consumed power for preliminary air conditioning, so that time for charging a battery becomes longer. However, when the consumed power in preliminary air conditioning is reduced by the control shown in the flowchart of FIG. 7, lengthening of the time for charging a battery is suppressed.

Finally, the embodiment of the present invention will be summarized. Referring to FIG. 3, vehicle 100 according to the present embodiment includes an air-conditioning device (air-conditioner unit 400) which heats cabin 500 with use of power of an external power supply or a vehicle (power of battery 360 or the like), and a controller (ECU 200) which allows an air-conditioning device (air-conditioner unit 400) to perform remote air conditioning, which is air-conditioning performed in a state where a user is not riding in vehicle 100, and operation air conditioning, which is air conditioning performed by user's operation in a state where a user is riding in vehicle 100. The controller (ECU 200) controls the air-conditioning device (air-conditioner unit 400) so that air of the air-conditioning device (air-conditioner unit 400) is supplied to cabin 500 of vehicle 100 based on a warm-up state of the air of the air-conditioning device (air-conditioner unit 400). Further, when the remote air conditioning is performed, the controller (ECU 200) controls the air-conditioning device (air-conditioner unit 400) so that air of the air-conditioning device (air-conditioner unit 400) is supplied to cabin 500 even in a state where the warm-up state is lower than in a case where air of air-conditioning device (air-conditioner unit 400) is supplied to cabin 500 in the operation air conditioning.

Preferably, as shown in FIG. 7, when controlling the air quantity of the air-conditioning device (air-conditioner unit 400) in the remote air conditioning, the controller (ECU 200) controls the air quantity of the air-conditioning device without taking into account the warm-up state but the target blowing temperature (step S106). Further, when controlling the air quantity of the air-conditioning device (air-conditioner unit 400) in the operation air conditioning, the controller (ECU 200) controls the air quantity of the air-conditioning device taking into account the warm-up state and target blowing temperature (steps S104, S105).

A vehicle 100 can be configured to include an air-conditioning device (air-conditioner unit 400) which heats a cabin 500 with use of power of an external power supply or vehicle 100 (power of a battery 360 or the like), and a controller (ECU 200) which allows the air-conditioning device (air-conditioner unit 400) to perform remote air conditioning, which is air conditioning performed by operation to a remote controller, and operation air conditioning, which is air conditioning performed by operation to an operation panel 520 in cabin 500. The controller (ECU 200) controls the air-conditioning device (air-conditioner unit 400) so that air of the air-conditioning device (air-conditioner unit 400) is supplied to cabin 500 of vehicle 100 based on a warm-up state of the air of the air-conditioning device (air-conditioner unit 400). Further, when the remote air conditioning is performed, the controller (ECU 200) controls the air-conditioning device (air-conditioner unit 400) so that air of the air-conditioning device (air-conditioner unit 400) is supplied to cabin 500 even in a state where the warm-up state is lower than in a case where air of air-conditioning device (air-conditioner unit 400) is supplied to cabin 500 of vehicle 100 in the operation air conditioning.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle having a cabin, the vehicle comprising:
an air-conditioning device configured to heat the cabin of the vehicle via electric power supplied from an external power supply; and
a controller programmed to control the air-conditioning device to:
  perform remote air conditioning, which is air conditioning performed in a state where a user is not present in the vehicle, the remote air conditioning including:
    (1) during a warm-up control in which a blowing amount is suppressed in an initial stage of heating operation and thereafter the blowing amount is gradually increased, the controller controlling the air-conditioning device to provide a smaller one of a first air quantity and a second air quantity until a water temperature of water passing through the air-conditioning device or a condenser temperature of a condenser provided in the air-conditioning device rises to a predetermined value, wherein the first air quantity is predetermined for the water temperature or the condenser temperature, and the second air quantity is predetermined for target blowing temperature,
    (2) after the warm-up control is performed to achieve a higher water temperature or condenser temperature than the predetermined value, the controller controlling the air-conditioning device to provide the second air quantity; and
  perform operation air conditioning, which is air conditioning performed in a state where a user is present in the vehicle, the operation air conditioning including:
    the controller controlling the air-conditioning device to provide the second air quantity regardless of the water temperature or the condenser temperature.

2. A vehicle having a cabin, the vehicle comprising:
an air-conditioning device configured to heat the cabin of the vehicle via electric power supplied from an external power supply; and
a controller programmed to control the air-conditioning device to:
  perform remote air conditioning, which is air conditioning performed by operation to a remote controller, the remote air conditioning including:
    (1) during a warm-up control in which a blowing amount is suppressed in an initial stage of heating operation and thereafter the blowing amount is gradually increased, the controller controlling the air-conditioning device to provide a smaller one of a first air quantity and a second air quantity until a water temperature of water passing through the air-conditioning device or a condenser temperature of a condenser provided in the air-conditioning device rises to a predetermined value, wherein the first air quantity is predetermined for the water temperature or the condenser temperature, and the second air quantity is predetermined for target blowing temperature,
    (2) after the warm-up control is performed to achieve a higher water temperature or condenser temperature than the predetermined value, the controller controlling the air-conditioning device to provide the second air quantity; and
  perform operation air conditioning, which is air conditioning performed by operation to an operation panel in the cabin, the operation air conditioning including:
    the controller controlling the air-conditioning device to provide the second air quantity regardless of the water temperature or the condenser temperature.

3. A vehicle comprising:
an air-conditioning device configured to supply air to a cabin of the vehicle; and
an electronic control unit programmed to control the air-conditioning device to:
  perform remote air conditioning, which is air conditioning performed in a state where a user is not present in the vehicle, the remote air conditioning including:
    (1) during a warm-up control in which a blowing amount is suppressed in an initial stage of heating operation and thereafter the blowing amount is gradually increased, the controller controlling the air-conditioning device to provide a smaller one of a first air quantity and a second air quantity until a water temperature of water passing through the air-conditioning device or a condenser temperature of a condenser provided in the air-conditioning device rises to a predetermined value, wherein the first air quantity is predetermined for the water temperature or the condenser temperature, and the second air quantity is predetermined for target blowing temperature,
    (2) after the warm-up control is performed to achieve a higher water temperature or condenser temperature than the predetermined value, the controller controlling the air-conditioning device to provide the second air quantity; and
  perform operation air conditioning, which is air conditioning performed in a state where a user is present in the vehicle, the operation air conditioning including:

the controller controlling the air-conditioning device to provide the second air quantity regardless of the water temperature or the condenser temperature.

\* \* \* \* \*